United States Patent
Polidi et al.

(10) Patent No.: US 6,456,931 B1
(45) Date of Patent: Sep. 24, 2002

(54) INDICATING DIRECTIONS TO DESTINATION AND INTERMEDIATE LOCATIONS IN VEHICLE NAVIGATION SYSTEMS

(75) Inventors: Ari I. Polidi, Mountain View; Gary Zuber, Santa Clara, both of CA (US)

(73) Assignee: Visteon Technologies, LLC, Dearborn, MI (US)

( * ) Notice: Subject to any disclaimer, the term of this patent is extended or adjusted under 35 U.S.C. 154(b) by 0 days.

(21) Appl. No.: 09/801,475

(22) Filed: Mar. 7, 2001

(51) Int. Cl.[7] .................................. G06F 165/00
(52) U.S. Cl. ................. 701/208; 701/210; 701/211; 701/201; 340/995; 340/990; 342/357; 342/419
(58) Field of Search ................... 701/208, 209, 701/210, 211, 201; 342/357, 357.13, 419; 340/995, 988, 990

(56) References Cited

U.S. PATENT DOCUMENTS

| | | | |
|---|---|---|---|
| 5,627,547 A | 5/1997 | Ramaswamy et al. | 342/357 |
| 5,712,788 A * | 1/1998 | Liaw et al. | 340/900 |
| 5,774,828 A | 6/1998 | Brunts et al. | 701/210 |
| 5,842,147 A | 11/1998 | Nimura et al. | 701/211 |
| 5,887,269 A | 3/1999 | Brunts et al. | 701/208 |
| 5,926,118 A * | 7/1999 | Hayashida et al. | 340/995 |
| 5,938,720 A * | 8/1999 | Tamai | 701/209 |
| 5,964,821 A | 10/1999 | Brunts et al. | 701/201 |
| 6,023,652 A | 2/2000 | Arakawa et al. | 701/201 |
| 6,112,154 A * | 8/2000 | Schupfner | 701/209 |
| 6,144,318 A * | 11/2000 | Hayashi et al. | 340/995 |
| 6,222,485 B1 * | 4/2001 | Walters et al. | 701/208 |

* cited by examiner

Primary Examiner—William A. Cuchlinski, Jr.
Assistant Examiner—Tuan C To
(74) Attorney, Agent, or Firm—Beyer Weaver & Thomas, LLP (57) ABSTRACT

The present invention provides a computer implemented method and apparatus for providing a directional arrow to intermediate locations to aid a user of a vehicle navigation system. According to one aspect of the present invention, a vehicle navigation system is provided and includes a processor configured to determiner the vehicle location from location data generated by a plurality of sensors. Where the location data does not correspond to map data in a map database, a directional indicator is generated on the display to indicate a first location corresponding to the map data. In one embodiment, the first location corresponds to a road segment in the map database nearest the vehicle location. In another embodiment, the processor is configured to identify an intermediate location on the route and generate a directional indicator on the display which indicates the direction to the intermediate location. In yet another embodiment, the processor is configured to automatically select an appropriate intermediate location in accordance with the measured angle between the vehicle heading and the intermediate location.

45 Claims, 11 Drawing Sheets

INDICATING DIRECTIONS TO DESTINATION AND INTERMEDIATE LOCATIONS IN VEHICLE NAVIGATION SYSTEMS

BACKGROUND OF THE INVENTION

The present invention relates to vehicle navigation systems. More specifically, the invention relates to the use of directional arrows displayed on vehicle navigation systems and associated with directions of travel to destinations.

Vehicle navigation systems have become more prevalent in recent times. Typically vehicle navigation systems employ a map database wherein information such as digitized road segments, points of interest, landmarks, and similar location data is stored. Some vehicle navigation systems use Global Positioning Sensors to determine the vehicle's location and compare the sensor data with the stored digitized map data. The degree to which road information is digitized varies considerably in different geographical areas. For instance, in a sparsely populated state or region, only roads of a high level in the road hierarchy might be digitized and stored in a map database. Densely populated regions, such as portions of the State of California, might have the vast majority of roads large and small stored in the map database. Even then, occasions may arise when the vehicle is located on a road which does not appear in the map database.

Vehicle navigation systems will include an output display to convey navigation information to the user. The output may take the form of maneuver instructions, a route map, a directional arrow or typically a combination of these features. The directional arrow, for example, will point in the direction from the vehicle's present location to the destination. Typically the displayed directional arrow will be dynamically updated to continuously adjust the direction of the directional arrow for changes in position and direction of the vehicle, whether it is traveling along a calculated route, departing from the route, or even located on a road not appearing in the digitized map database. The navigation system produces this directional data necessary for the display of the directional arrow after comparing the latitude and longitude coordinates of the vehicle's present location with coordinates of the destination as stored in the map database. Navigation by use of the directional arrow is an iterative process with the directional arrow constantly providing a visual display of the corrective action required by the driver to reach the desired destination. Ideally, the directional arrow will be pointed in the 12:00 position, indicating a convergence between the vehicle heading and the direction to the desired destination. For example, a directional arrow pointing in a 3:00 position would advise the driver that in order for the vehicle to be headed to the destination, a 90 degree turn to the right would be required. The use of directional arrows has, however, created certain problems.

Figure 1A:
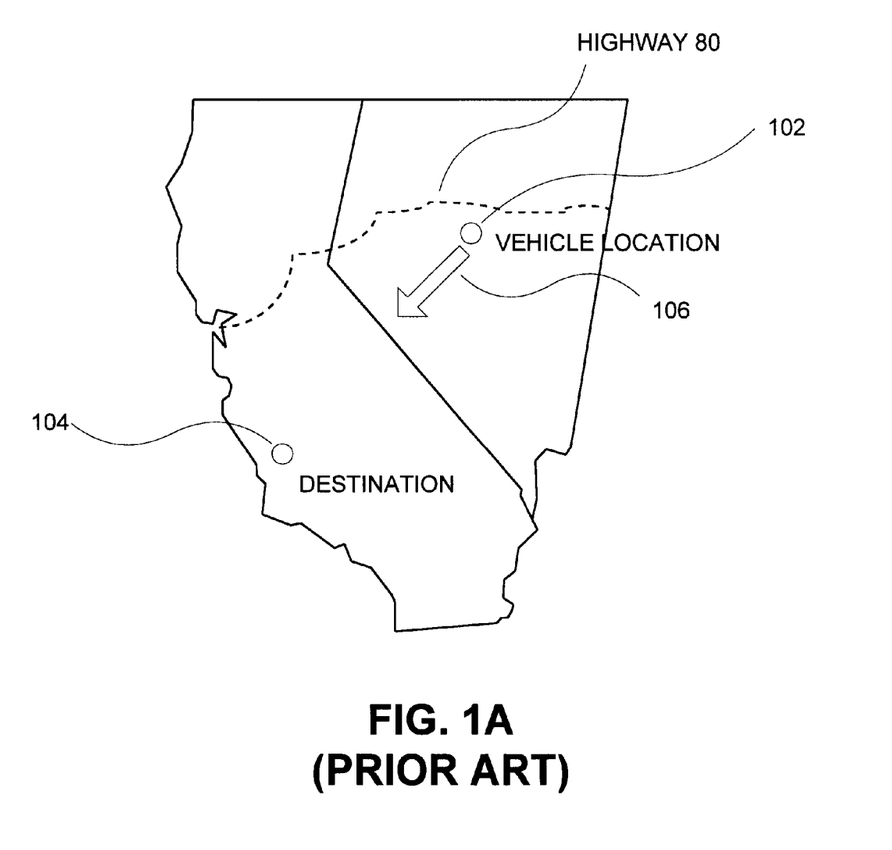
FIG. 1A is a diagram illustrating use of a directional arrow in vehicle navigation.

One problem occurs when using the directional arrow in a non-digitized area. For example, one vehicle navigation system upon startup compares the vehicle's present location with the map database. If no match is made, the system display indicates the direction to the destination with an arrow. Under this system the updated directional arrow will provide the sole navigation guidance to the user until the vehicle's present location coincides with a road segment stored in the map database. While the directional arrow can be helpful to the user, in many instances the information can be misleading. FIG. 1A shows an instance where this directional method would be of little use to the user. A vehicle located at location 102, perhaps in a rural area of Nevada on an undigitized road segment might intend to travel to a destination 104 in the Los Angeles area and be prompted with a directional arrow 106 pointing in a south-westerly direction. The problem with the directional arrow in this instance is that it would lead the user further into remote areas and away from the nearest major highway which might be east-west oriented Interstate Highway 80, even if the highway was only a few miles away. What is needed, therefore, is a method of using a directional arrow to direct a user to a more meaningful intermediate location when a vehicle is on an undigitized road segment.

Figure 1B:
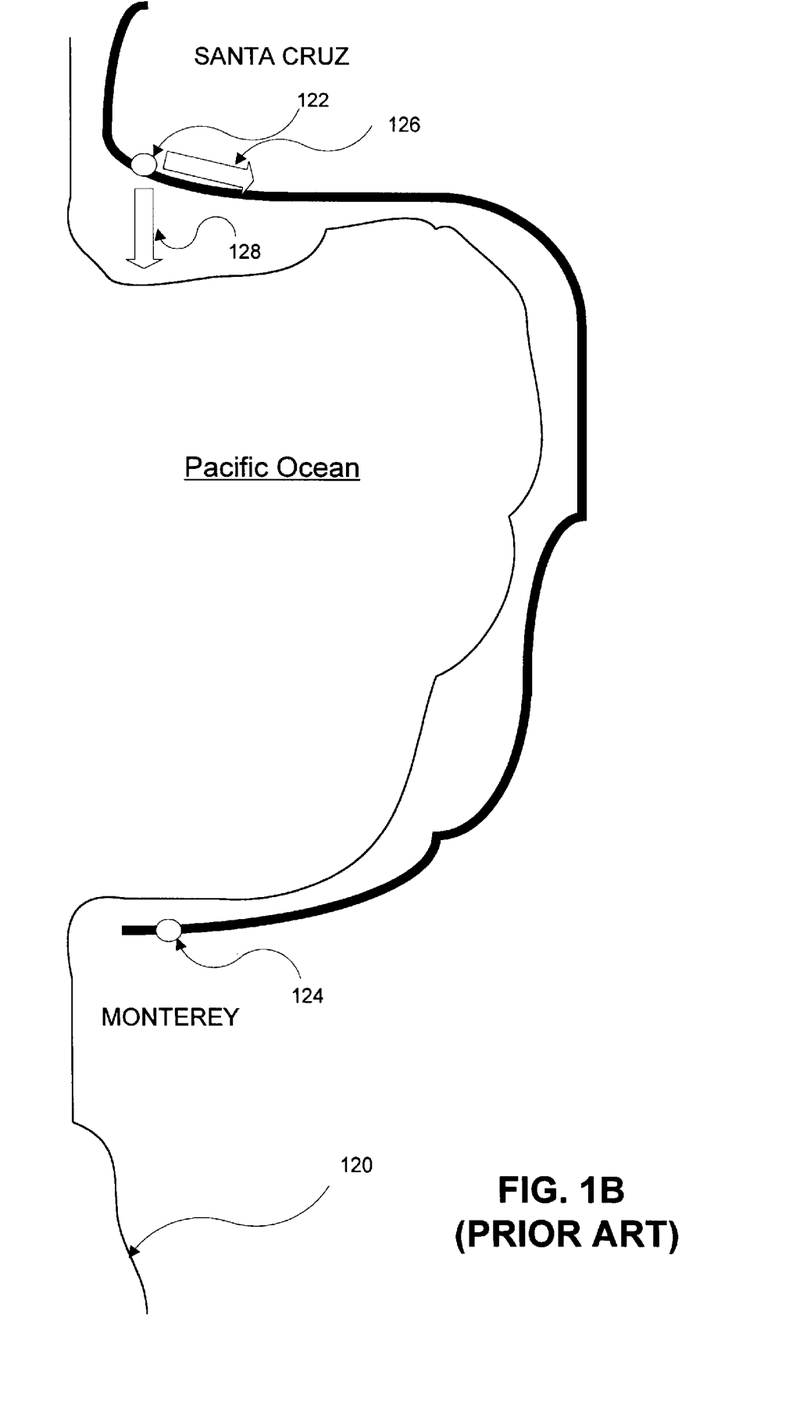
FIG. 1B is a diagram illustrating use of a directional arrow wherein the vehicle heading is in a direction contrary to the directional arrow indication.

A second problem experienced by vehicle navigation system users relying on directional arrows occurs when the vehicle is traveling along a calculated route in a direction contrary to the directional arrow. This divergence in directions occurs when the calculated route provides, at least on a temporary basis, a circuitous route to the destination. This situation can frequently occur when the geographical features of the region such as hills, mountains, rivers, lakes, oceans, etc. prevent a more direct routing to the destination. The divergence between the direction of travel and the direction to the destination can cause confusion to the user, thereby raising questions in the user's mind as to whether the navigation system is operating properly. FIG. 1B illustrates the problem as it would occur in a vehicle traveling along the California coastline 120. A vehicle located at position 122 near Santa Cruz and headed towards a destination 124 in Monterey would confront a directional arrow 128 pointed in a southerly direction, yet the vehicle heading 126 along the calculated route would be in an easterly direction. The opportunity for confusion in this instance would be especially great since the directional arrow 128 would be pointing directly into the Pacific Ocean. What is needed in this instance is again a more meaningful directional arrow so that the driver avoids confusing situations where the directional arrow is pointing in a significantly different direction than the vehicle heading, even though the vehicle is appropriately traveling along the calculated route.

Figure 1C:
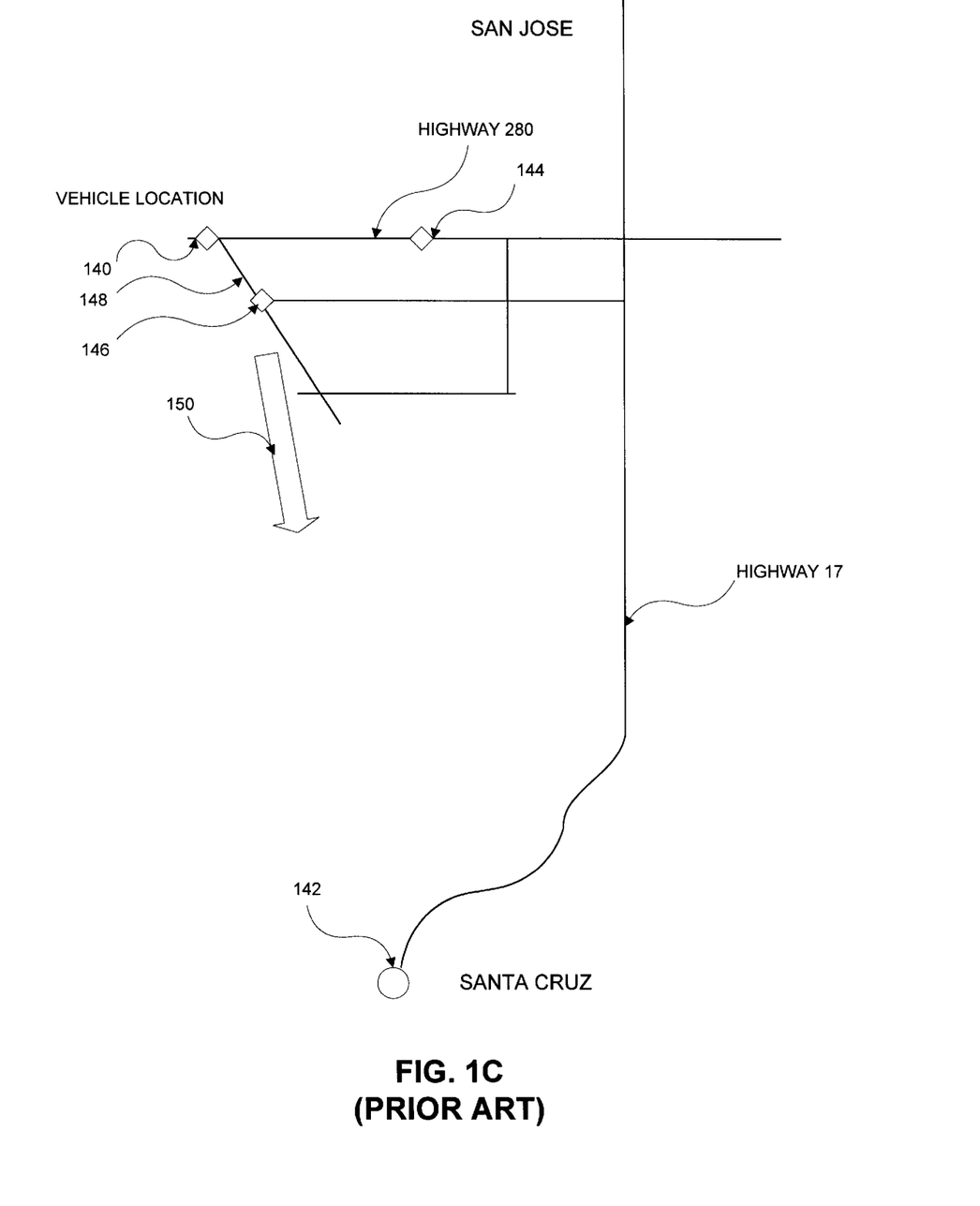
FIG. 1C is a diagram illustrating use of a directional arrow in vehicle navigation in a situation where the vehicle departs from a calculated route.

Yet another problem facing the users of vehicle navigation systems and directional arrows occurs when the vehicle, traveling on a route generated by the navigation system, departs from the calculated route and attempts to use the directional arrow to navigate to the destination. Problems such as traffic congestion, highway construction, and detours might compel a user to depart from the calculated route to avoid traffic. Other circumstances giving rise to such a situation include voluntary departures from the route to visit a point of interest or landmark and general attempts by drivers to find shortcuts, irrespective of the traffic conditions on the calculated route. Even after the vehicle had departed from the calculated route, the directional arrow appearing on the display under present systems still would lead the user to the final destination. The problem with this approach is that even though it might be far more efficient to get back onto the calculated route immediately after passing the congestion or bottleneck, the directional arrow may direct the user away from the best point of access to the original route. FIG. 1C illustrates the problems inherent in such a situation. A vehicle at location 140 on eastbound Highway 280 near San Jose traveling to destination 142 near Santa Cruz may opt to depart from the calculated route to avoid a traffic accident or congestion at location 144. Once off of the calculated route at location 146 on road segment 148, the vehicle navigation system maneuver instructions would provide no assistance to the driver in navigating to the destination. In similar fashion, the directional arrow 150 would provide little assistance to the driver since it would be pointing only to the final destination 142 near Santa Cruz in a general direction where there may be an absence of roads or alternately only secondary level or unimproved roads. What is needed is a directional arrow which will provide more useful directional indications in such a situation.

BRIEF SUMMARY OF THE INVENTION

The present invention provides methods and apparatus for generating directional indicators on vehicle navigation displays. To achieve the foregoing, the present invention provides a directional arrow on a vehicle navigation system display to assist a driver in driving to a destination. In cases where the vehicle is not at a location matching a road segment in a map database of the system, the directional arrow points to a nearest road segment from the map database instead of the destination. This proves to be useful when the vehicle location is in a rural area and the direction to the destination is away from the nearest road segment. In another aspect of the present invention, the display provides a directional arrow to one or more intermediate locations along the route calculated by the system. This can assist drivers who choose to depart from the calculated route to avoid congestion along the route from traffic, construction, or other delays or when the vehicle is traveling on a winding road.

According to one aspect of the present invention, a vehicle navigation system is provided and includes a processor configured to determine the vehicle location from location data generated by a plurality of sensors. Where the location data does not correspond to map data in a map database, a directional indicator is generated on the display to indicate a first location corresponding to the map data. In one embodiment, the first location corresponds to a road segment in the map database nearest the vehicle location. In another embodiment, the processor is configured to identify an intermediate location on the route and generate a directional indicator on the display which indicates the direction to the intermediate location. In yet another embodiment, the processor is configured to monitor an angle between a current vehicle heading and a directional indicator corresponding to a first location associated with a route. When the angle exceeds a threshold, the directional indicator displayed corresponds to an intermediate location.

Computer implemented methods for navigating using a vehicle navigation system are also provided.

These and other features and advantages of the present invention are described below with reference to the drawings.

DETAILED DESCRIPTION OF THE INVENTION

Reference will now be made in detail to some specific embodiments of the invention. Examples of specific embodiments are illustrated in the accompanying drawings. While the invention will be described in conjunction with these specific embodiments, it will be understood that it is not intended to limit the invention to any particular specific embodiment. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In other instances, well known process operations have not been described in detail in order not to unnecessarily obscure the present invention.

Figure 2:
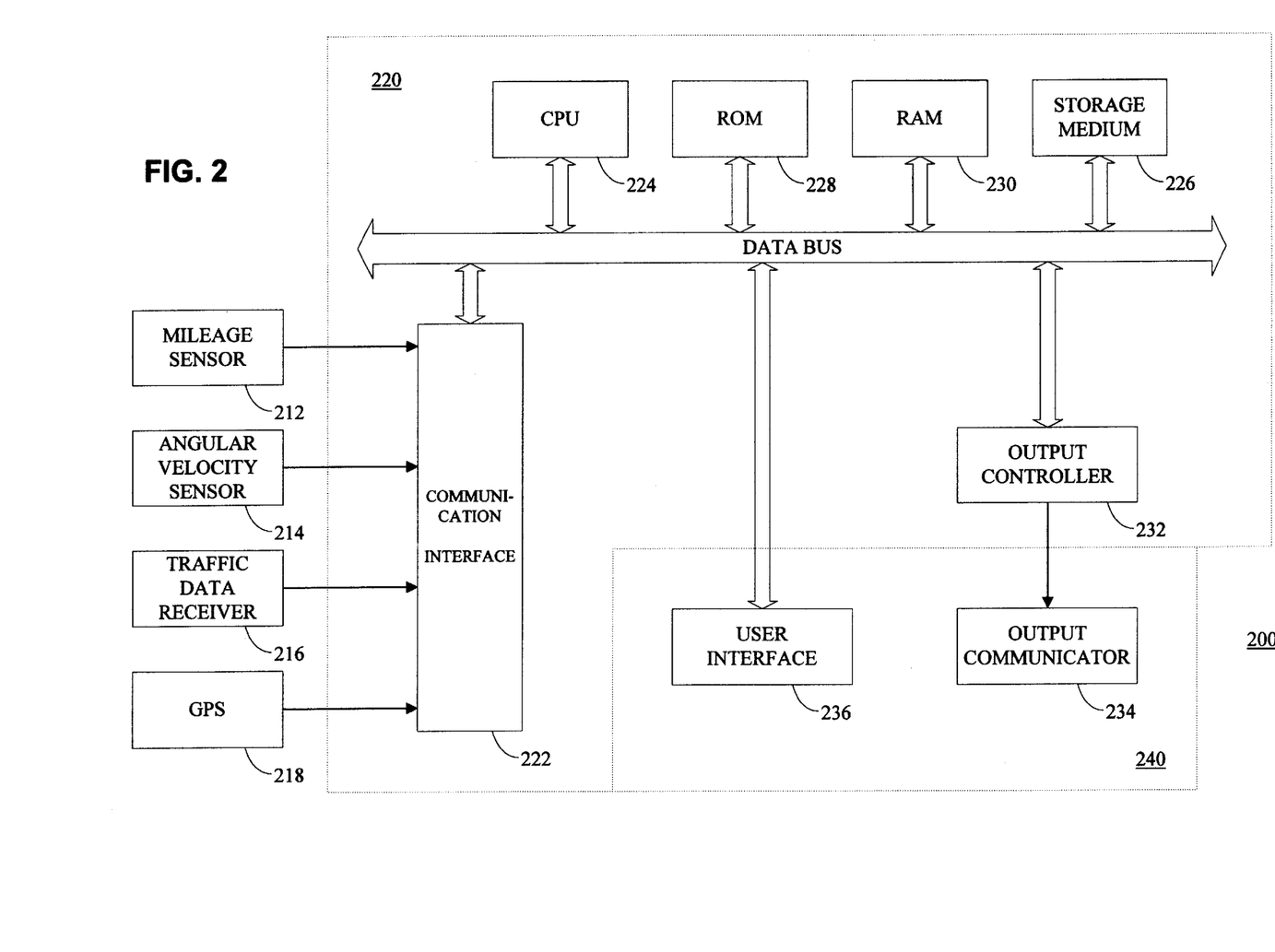
FIG. 2 is a block diagram of a vehicle navigation system for use with the present invention.

FIG. 2 is a block diagram of a specific embodiment of a vehicle navigation system 200 for use with the present invention. Sensors 212 and 214, traffic data receiver 216, and GPS receiver 218 are coupled to computing means 220 through sensor/GPS interface 222. In typical embodiments, mileage sensor 212 comprises an odometer, and angular velocity sensor 214 comprises a gyroscope, or a differential odometer coupled to the wheels of the vehicle. Traffic data receiver 216 may comprise any of a wide variety of RF receivers which are operable to receive real time traffic data transmitted in a variety of formats. A global positioning system (GPS) data receiver 218 is provided for receiving signals from, for example, a satellite-based navigation system. Data from sensor/GPS interface 222 is transmitted to CPU 224, which performs calibration, signal processing, dead-reckoning, vehicle positioning, and route calculation and guidance functions. A database containing map information may be stored in database medium 226, with software directing the operation of computing means 220 stored in main memory 228 for execution by CPU 224. Various embodiments of the present invention are embodied as such software. Memory 228 may comprise any of a wide variety of non-volatile memory such as, for example, read-only memory (ROM), reprogrammable nonvolatile memory such as flash memory or SRAM, CD ROM, optical disk, or PCMCIA cards. System RAM 230 permits reading and writing of the information necessary to execute such software programs. Database medium 226 may comprise non-volatile memory, a hard disk drive, CD-ROM, or an integrated circuit in which digitized map information has been stored. Output controller 232, which may comprise a graphics controller, receives data processed by CPU 224 and transmits the data to display console 240 which includes output communicator 234, usually comprising a display screen with associated audio electronics and speakers. The user may input data, such as a desired destination, through user interface 236, typically comprising a keyboard. Alternatively user interface 236 may comprise a microphone coupled to speech recognition circuitry allowing a user to communicate with the system using voice commands.

The map database stored in database medium 226 preferably comprises positional data such as, for example, latitude and longitude coordinates, to describe road intersections or nodes, road segments, landmarks and points of interest, and other geographical information. The data base may further comprise data representing characteristics of roads or places on the map, such as road and place names, road features such as dividers, one-way restrictions, surface, speed limit, shape, elevation, and other properties. According to specific embodiments of the invention, the map database includes cost values associated with individual nodes and road segments. These cost values correspond to the estimates of time intervals for traversing the respective node or segment. Node cost values take into consideration such information as, for example, whether the vehicle would encounter oncoming traffic, thus delaying a left turn maneuver. Segment costs reflect road segment characteristics such as speed limit and segment length, both of which affect the travel time along the segment. Also associated with each road in the map database is a hierarchy value which relates to the category or type of the road. For example, the highest level category of the hierarchy includes freeways and expressways. The lowest level includes residential streets and/or alleys. The information stored in map database medium 226 is employed with the data received from interface 222 for route calculation and guidance. A directional arrow for navigation guidance will typically appear on the display screen in output communicator 234.

Directional arrows provide important vehicle navigation guidance to users in many situations. Vehicle navigation systems will typically determine the best route to a destination from a vehicle's present position, often determined from data provided by the GPS receiver 218. The primary vehicle navigation guidance is generally provided in the form of maneuver instructions provided to the driver sequentially and corresponding to the vehicle position as it traverses the calculated route. In such situations, auxiliary guidance will typically be provided by a directional arrow also appearing on the display to indicate the direction to the destination. In some situations, such as when the vehicle's positional coordinates as determined from the data received by the GPS receiver 218 do not correspond to a road segment stored in map database 226, the directional arrow will provide the sole navigation guidance to the destination. As indicated in the background section, the use of a directional arrow in previous systems often creates problems when the arrow is used as the sole means of navigational guidance and when the arrow is used as auxiliary guidance in addition to the maneuver instructions generated by the navigation system. The present invention provides a solution to these various problems by redirecting the arrow to intermediate locations, as illustrated by the descriptions of the embodiments set forth below.

For example, when a vehicle lies on a road segment which does not appear in the map database 126 as illustrated in FIG. 1A, vehicle navigation systems are generally incapable of providing maneuver instructions from the vehicle location to the destination. While the coordinates as provided by the GPS receiver will enable the system to determine a direction to the destination coordinates, the absence of digitized road segment data in the map database 126 for at least the immediate vicinity around the vehicle prevents the system from calculating a road segment by road segment routing from the vehicle location to the destination. Many systems will, however, display the directional arrow to the destination. As indicated above and as illustrated in FIG. 1A, a directional arrow which leads the user through remote areas, such as deserts and mountains, in lieu of a nearby interstate highway provides no help to the user. Many geographical features including lakes, mountains, rivers, bays, deserts, canyons, and the like will give rise to such problems in varying degrees. Moreover, the absence of improved roads occurs in certain areas irrespective of the presence or absence of these geographical features. Route calculation typically takes into consideration the hierarchy value for a road segment in the map database which relates to the category or type of road. For example, given essentially similar distances and routing direction between points A and B, navigation systems will generally choose for the calculated route a higher category of road such as an interstate highway. Thus, even though the directional arrow to the destination may lead to an unimproved or other low category road, alternate routing along higher category roads would be more desirable. The present invention in one embodiment solves these problems by directing the user to the nearest digitized road segment in lieu of directing the vehicle through remote areas which might contain an absence of roads or only unimproved roads.

Figure 3A:
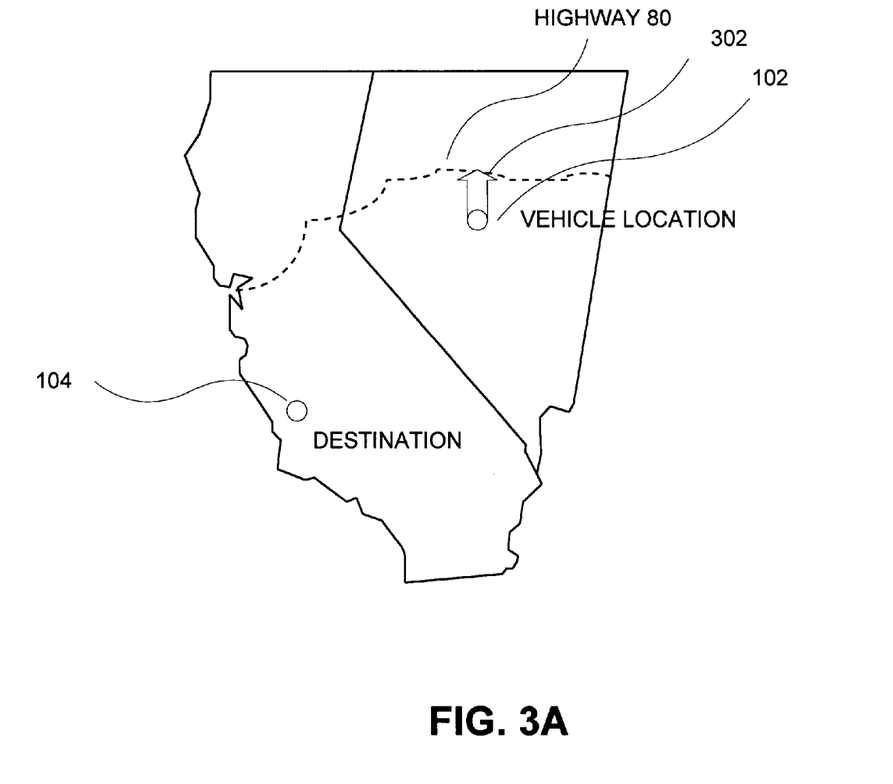
FIG. 3A is a map diagram illustrating use of a directional arrow in accordance with one embodiment of the present invention.

FIG. 3A is a simplified map diagram for illustration of the use of a directional arrow in accordance with one embodiment of the present invention. The vehicle at vehicle location 102 in a remote and undigitized area is provided with a directional arrow 302 pointing to the nearest digitized road segment, here Highway 80. The net effect is that the vehicle is guided to an interstate highway rather than through remote and mountainous terrain.

Figure 3B:
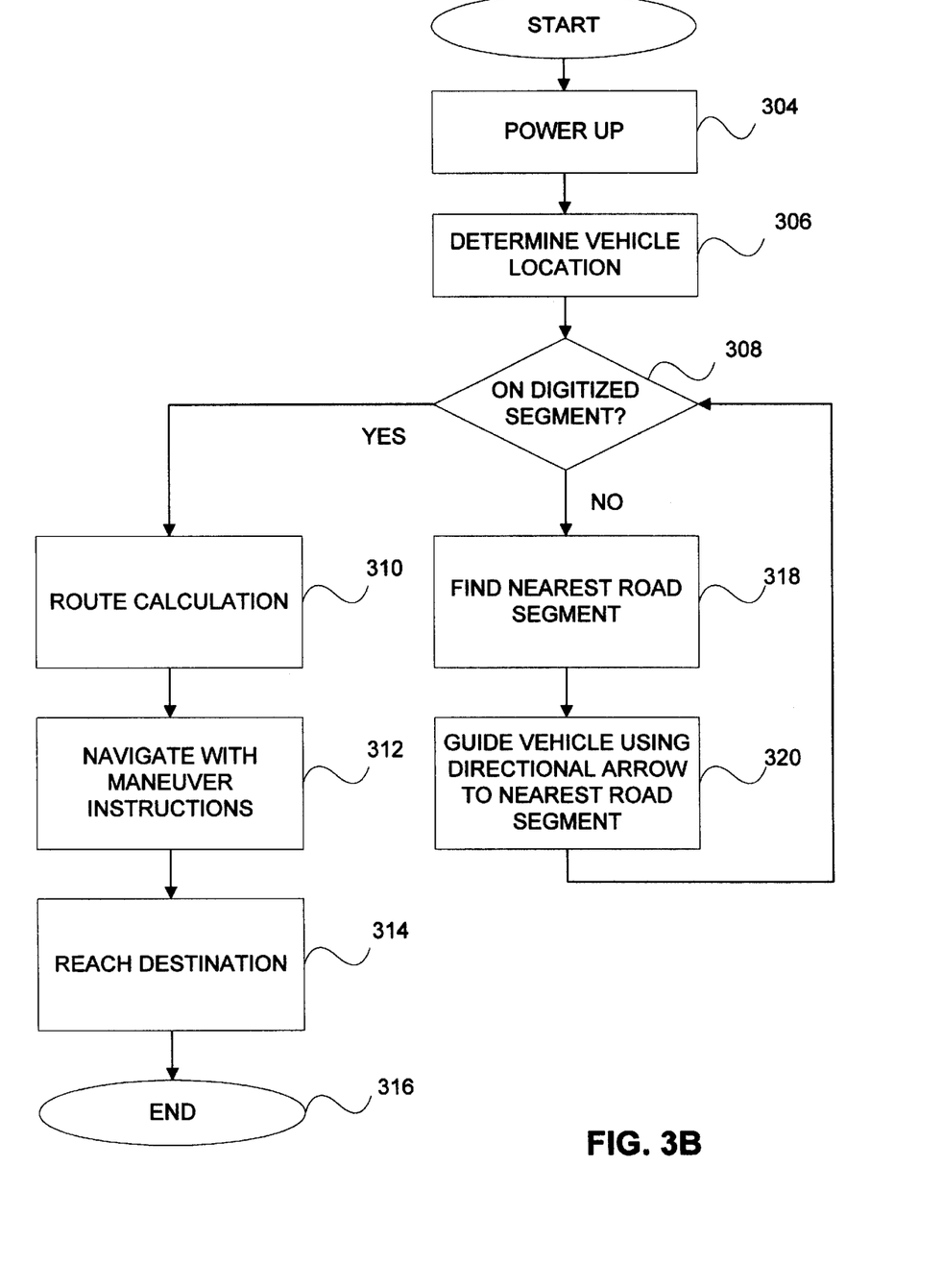
FIG. 3B is a flowchart illustrating a method of guiding a vehicle using a directional arrow in accordance with one embodiment of the present invention.

FIG. 3B is a flowchart illustrating a method of guiding a vehicle using a directional arrow in accordance with this embodiment. After powering of the vehicle navigation system (304), the vehicle location is determined (306). This can be accomplished by using the data provided by the vehicle navigation system's GPS receiver 218 as processed by the system's CPU 224. According to one embodiment, the vehicle position is reported as a combination of latitude and longitude coordinates. This vehicle location is compared by the system CPU with the digitized information stored in the map database 226 to determine if the vehicle lies on a digitized road segment (308). Where a match occurs, route calculation (310) proceeds in accordance with various methods known to those of skill in the art to determine the optimal route from the present vehicle position as matched with the digitized data in the map database to the selected destination. Once the optimal route to the destination is determined by the system, the system instructs the user to navigate to the destination by providing a series of maneuver instructions (312). Once all of the maneuver instructions are followed to completion, the destination is reached (314) and navigation ends (316). During the process of navigating with the maneuver instructions, the system may optionally provide directional arrow guidance to the destination in accordance with methods currently used by several navigation systems or may provide directional arrow guidance to intermediate locations in accordance with other embodiments of the present invention, as set forth below.

If, at 308, it is determined that the vehicle does not presently lie on a digitized road segment, the system provides directional arrow assistance to the nearest digitized road segment. While the process has been described as generating the directional arrow at the time of powering up of the system, the invention is not so limited. In one embodiment, the processor generates the directional arrow when the vehicle location diverges from the map data. This may occur, for example, when the vehicle leaves a digitized road to enter onto an undigitized parking facility or an undigitized road segment. The nearest digitized road segment is determined (318) utilizing in one embodiment an omnidirectional search. Other embodiments may weight the search so that the road segments in the general direction of the destination may be selected over slightly nearer segments in other directions. In yet other embodiments, the search may be filtered so that the nearest digitized road segment selected by the system is a road of a specified minimum hierarchy or rank. This feature prevents the problematic situation which may occur when the directional arrow points to a secondary, tertiary, or a generally unimproved road. In one embodiment, the search may encompass points of interest and landmarks in addition to road segments. In yet another embodiment, the user may be aware of an intermediate location in the direction of travel, such as a landmark, point of interest, or specific road segment, and may specify that location as the target for the directional arrow by entering the information through the system's input means such as a keyboard or through a soft key on the display console.

Once the nearest digitized road segment is found, the vehicle navigation system displays a directional arrow to that road segment so as to efficiently guide the user to a location in the map database (320). Once the vehicle's location coincides with a digitized road segment (308), route calculation (310) and navigation with maneuver instructions (312) may proceed as indicated previously.

As illustrated in FIG. 1B, a second problem facing users of vehicle navigation systems is the potential confusion caused by the divergence between the vehicle heading on a calculated route and the directional arrow to the destination. These problems may be prevalent, for example, when a user is traveling a serpentine road or otherwise when nearby geographical features such as mountains, rivers, lakes, bays, etc. interfere with a more direct routing to the destination. The present invention, in another embodiment, solves these problems by providing a directional arrow to intermediate locations along the calculated route.

Figure 4A:
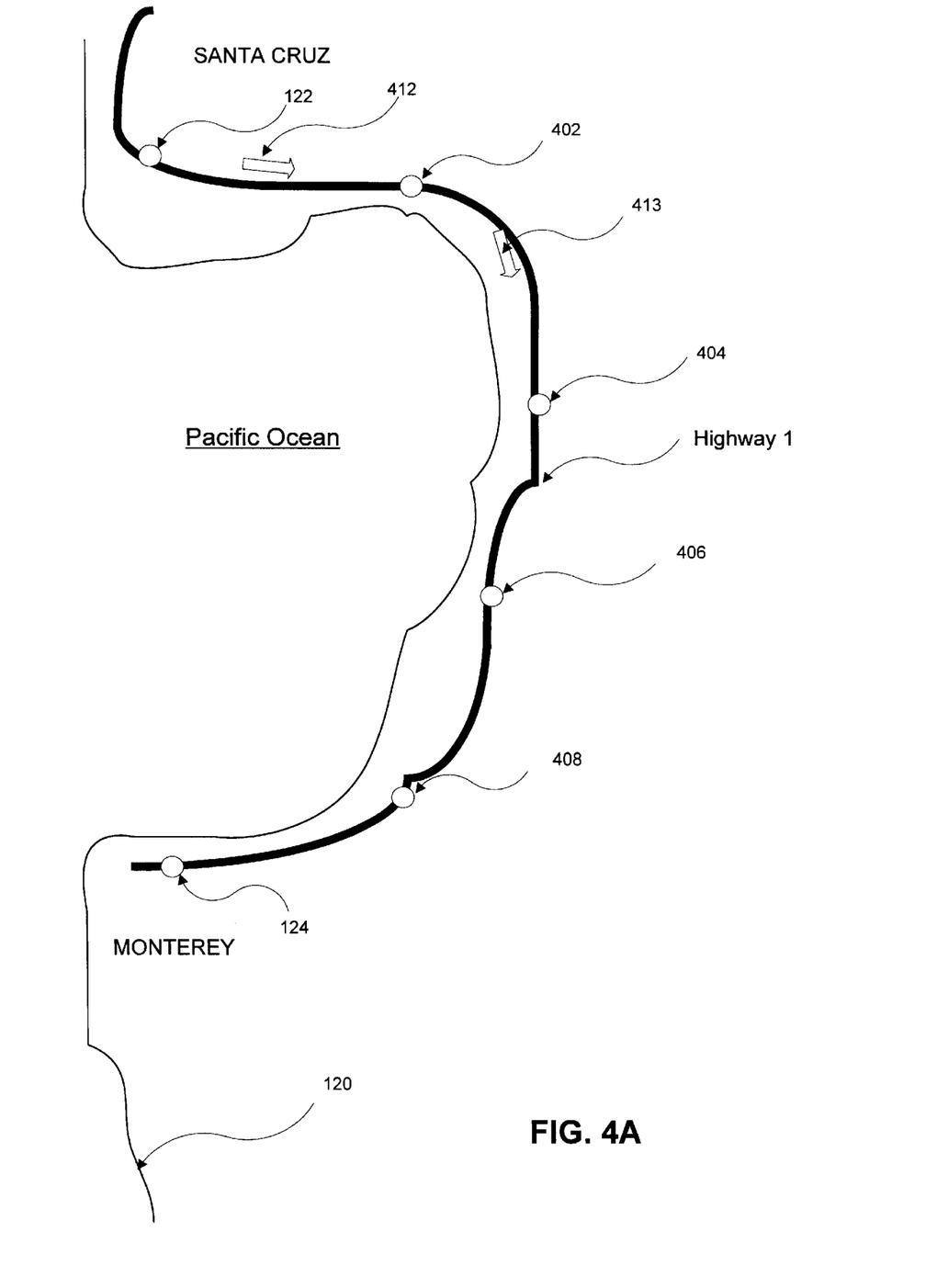
FIG. 4A is a map diagram illustrating use of a directional arrow in accordance with another embodiment of the present invention.

As illustrated in FIG. 4A, a vehicle departing from Santa Cruz and headed on southbound Highway 1 towards a destination 124 in Monterey, in accordance with this embodiment, will receive directional arrows in succession to upcoming intermediate locations 402–408. For instance, directional arrow 412 will appear until intermediate location 402 is reached. At that point a directional arrow 413 will appear indicating the direction to intermediate location 404. This process repeats for locations 406 and 408. When the vehicle passes location 408, the directional arrow points to location 124, i.e., the final destination.

Figure 4B:
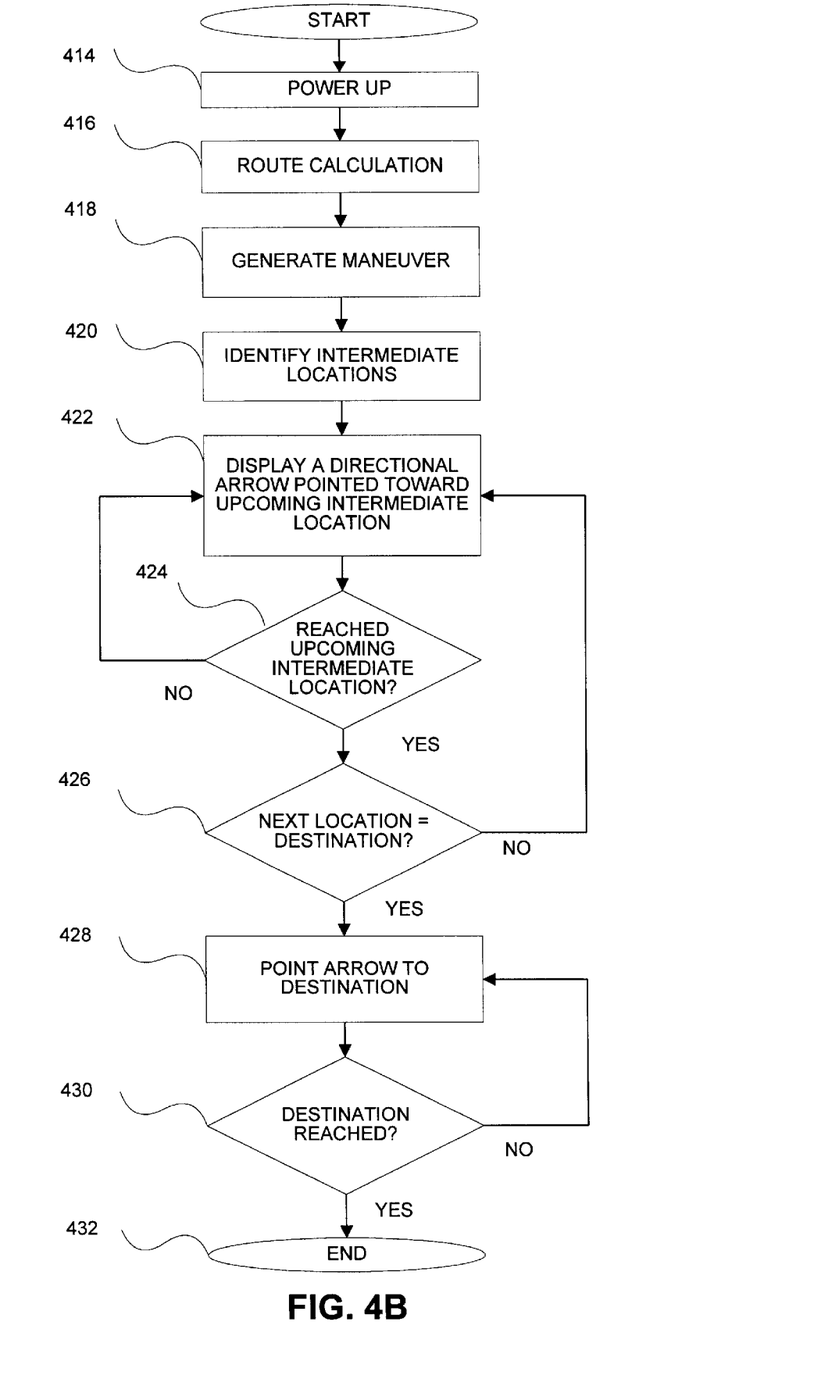
FIG. 4B is a flowchart illustrating a method of guiding a vehicle using a directional arrow in accordance with another embodiment of the present invention.

FIG. 4B is a flowchart illustrating a method of guiding a vehicle with directional arrows to intermediate locations in accordance with this embodiment of the present invention. Following powerup (414), route calculation is performed (416) to determine an optimal route to the destination in accordance with one of several methods known to those skilled in the relevant art. Specific examples of route generation are described in U.S. Pat. Nos. 5,712,788 and 5,938,720, the entire disclosures of which are incorporated herein by reference for all purposes. Once the optimal routing to the destination has been calculated, the navigation maneuvers included in the routing are generated (418). Once the maneuvers are generated, intermediate locations along the route are identified (420). Examples of intermediate locations include intersections of highways but could include other digitized data such as points of interest and landmarks. In one embodiment, the digitized data corresponding to locations in the map database are ranked. For example, higher category road segments such as freeways or freeway on ramps have higher ranks associated therewith. The processor is capable of selecting intermediate locations having ranks higher than a predetermined value. Typically, the display will indicate several upcoming maneuver instructions. Concurrently, in this embodiment, a directional arrow pointed towards the next intermediate location of the group of locations identified in 420 will be displayed (422). As long as the next intermediate location has not been reached, the directional arrow pointed to the next intermediate location will be displayed. If the upcoming intermediate location has been reached (424), a determination is made as to whether the next location is the destination (426). If the destination is not the next location in the series, control reverts back to block 422 which displays a directional arrow toward the upcoming intermediate location. Where the destination is the next location in the series, the directional arrow is pointed to the destination (428). Once the destination has been reached (430), the process ends (432).

As illustrated in FIG. 1C and described previously, a third problem facing the users of vehicle navigation systems might occur when the vehicle is already traveling on a route generated by the navigation system but opts to depart from the route for one or more reasons. Problems such as traffic congestion, highway construction, and detours often compel a user to depart from the calculated route to avoid delays. Once off of the calculated route, the directional arrow appearing on the display under systems previously used still points to the final destination. The problem with this approach is that the driver may desire to get back onto the calculated route immediately after passing the congestion or bottleneck but the destination directional arrow 150 directs him only to the final destination, as illustrated in FIG. 1C. Where the directional arrow 150 is focused on the destination 142, little assistance may be provided to the driver in terms of circumventing the congestion and returning immediately to the calculated route. The present invention solves the problems presented by this approach by providing the user with a directional arrow pointed to an appropriate intermediate location.

Figure 4C:
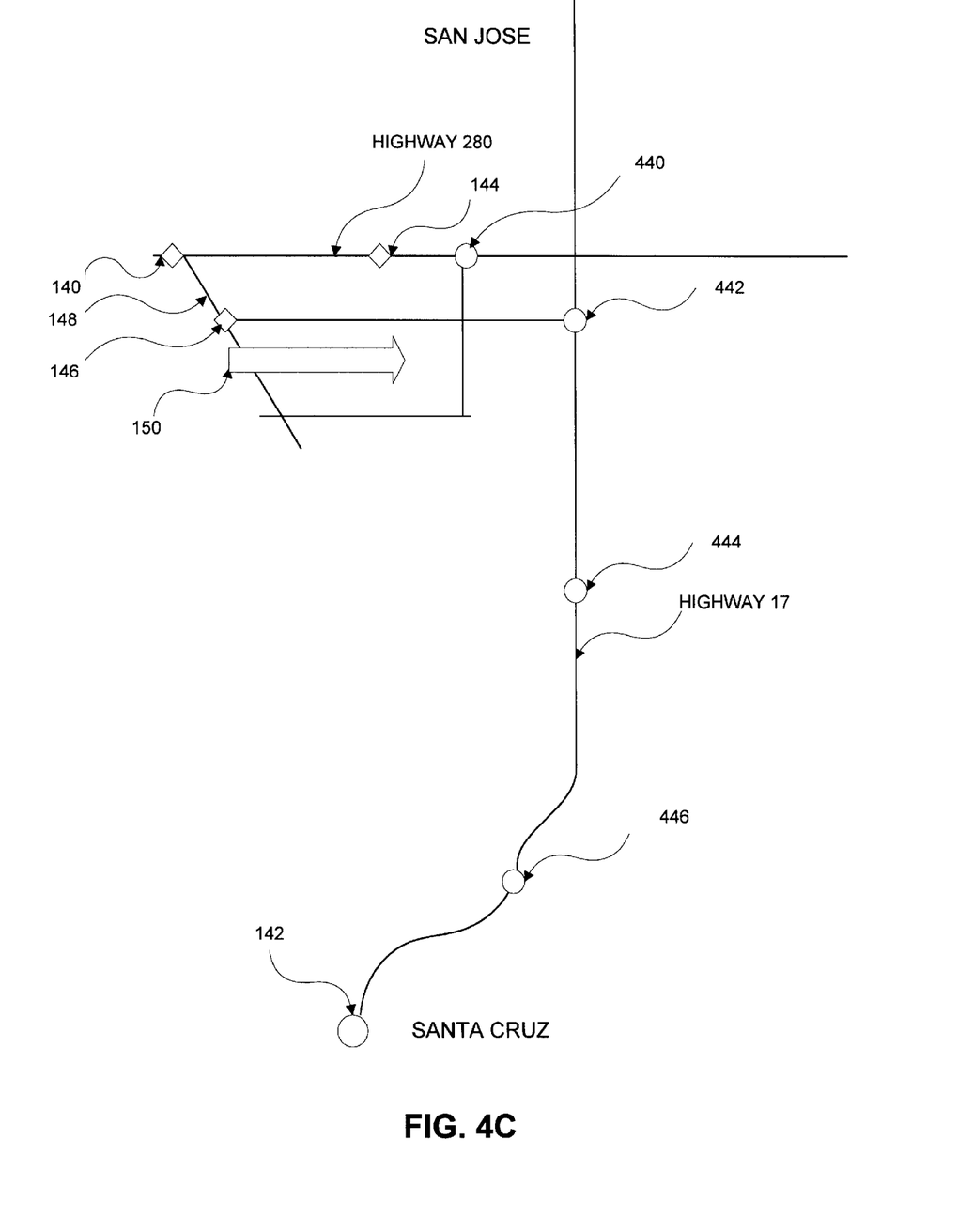
FIG. 4C is a map diagram illustrating use of a directional arrow in accordance with another embodiment of the present invention.

The advantages to this approach are illustrated in FIG. 4C. The vehicle exiting from the routing generated by the navigation system is pointed to an appropriate intermediate location, one of the group 440–446, instead of the final destination 142. This enables the user to return to Highway 280 or intersecting Highway 17 efficiently and shortly after the traffic congestion is avoided at location 144 on highway 280. The flowchart illustrated in FIG. 4B is also applicable to the problem created by departures from the calculated route to avoid traffic congestion and other problems. However, once the system is directed to display a directional arrow pointed to an upcoming intermediate location (422), the system must make a determination as to whether the directional arrow to that intermediate location is appropriate, i.e., makes sense. The system can accomplish this by referring to its map database to determine whether the vehicle's current off-route position is sufficiently connected to the upcoming intermediate location, i.e., without requiring backtracking or perhaps travel over tertiary or unimproved roads. Those of ordinary skill in the art will understand that conventional searching algorithms may be used to make this determination. In addition, such algorithms may be limited, according to specific embodiments, to searching only certain rank road segments to filter out connections which would be difficult or overly time consuming. In one embodiment, the processor can determine whether the upcoming intermediate location lies beyond a distance specified by the user through an input means. For example, the user may input into the system that that the navigation system should skip forward to maneuvers one mile from the vehicle location. In this instance, directional arrows pointing to only those intermediate locations on the route beyond this distance will be displayed, starting with the closest of the qualifying intermediate locations. In yet another embodiment, traffic information such as congestion, road detours, road closures, etc. for road segments maybe communicated to the system from a traffic information receiver. The processor may be configured to determine whether the upcoming intermediate locations are appropriate based on whether they lie between the traffic congestion and the destination. Where the intermediate location lies on the calculated route but before the congestion, the processor would determine it to be an inappropriate target and initiate a search for another intermediate destination as a target for the directional indicator.

If it is determined that the vehicle's current position is not appropriately connected to the upcoming intermediate location, the next intermediate location is selected and the connectivity determination repeated. The process may be repeated for each successive intermediate location (up to and including the final destination) until the best location to which the directional arrow should be pointed is determined.

Alternatively, the system could simultaneously calculate routes from the current off-route vehicle position to each of some subset of the intermediate locations and, using any of a variety of techniques to compare the various routes, point the directional arrow to the intermediate location which the vehicle may most easily or quickly reach.

Figure 5:
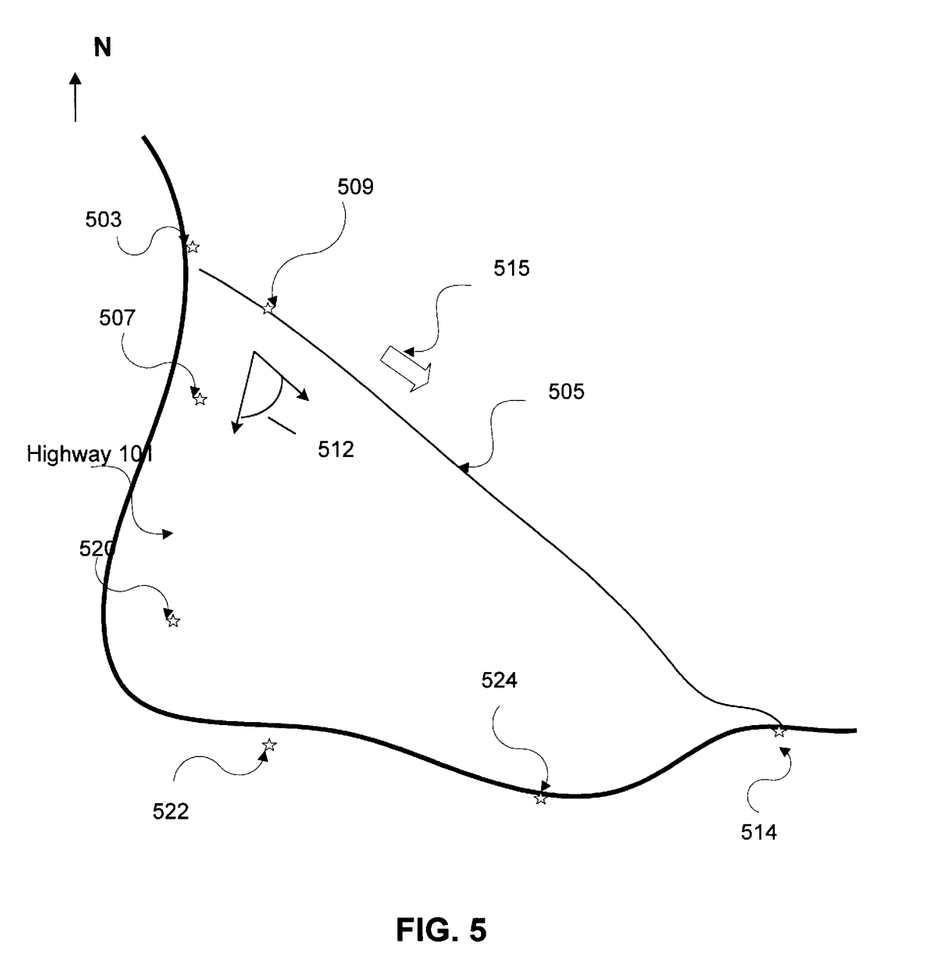
FIG. 5 is a diagram illustrating the use of a directional arrow pointing to intermediate locations in accordance with one embodiment of the present invention.

FIG. 5 illustrates another situation in which the vehicle leaves the calculated route. This situation will now be used to discuss a further refinement of the present invention. In this example, the vehicle is traveling southbound on Highway 101 near location 503 when it diverts from the calculated route (Highway 101) to a bypass route 505. According to one embodiment, the directional arrow continues to point to intermediate location 507, even after the vehicle has traveled to location 509 on the bypass route 505. As the vehicle approaches location 509, the vehicle heading increasingly diverges from the directional arrow indication by angle 512. According to a specific embodiment, the intermediate location to which the directional arrow points is automatically changed by the system when the angle 512 between the vehicle heading and the direction to the intermediate location 507 exceeds a predetermined threshold level. In more specific embodiments, the system may additionally use information as to the vehicle's heading and digitized map data to calculate the point 514 where the heading would likely intersect the route generated by the system. This intersection point 514 of the secondary route and the original route previously generated by the system could then serve as the intermediate location to which the directional arrow 515 would point. In another embodiment, the list of intermediate locations, such as locations 520, 522, 524, and 514 are sequentially examined so that the directional arrow 515 points to the intermediate location which makes sense (as discussed above with reference to FIG. 4C).

Figure 6:
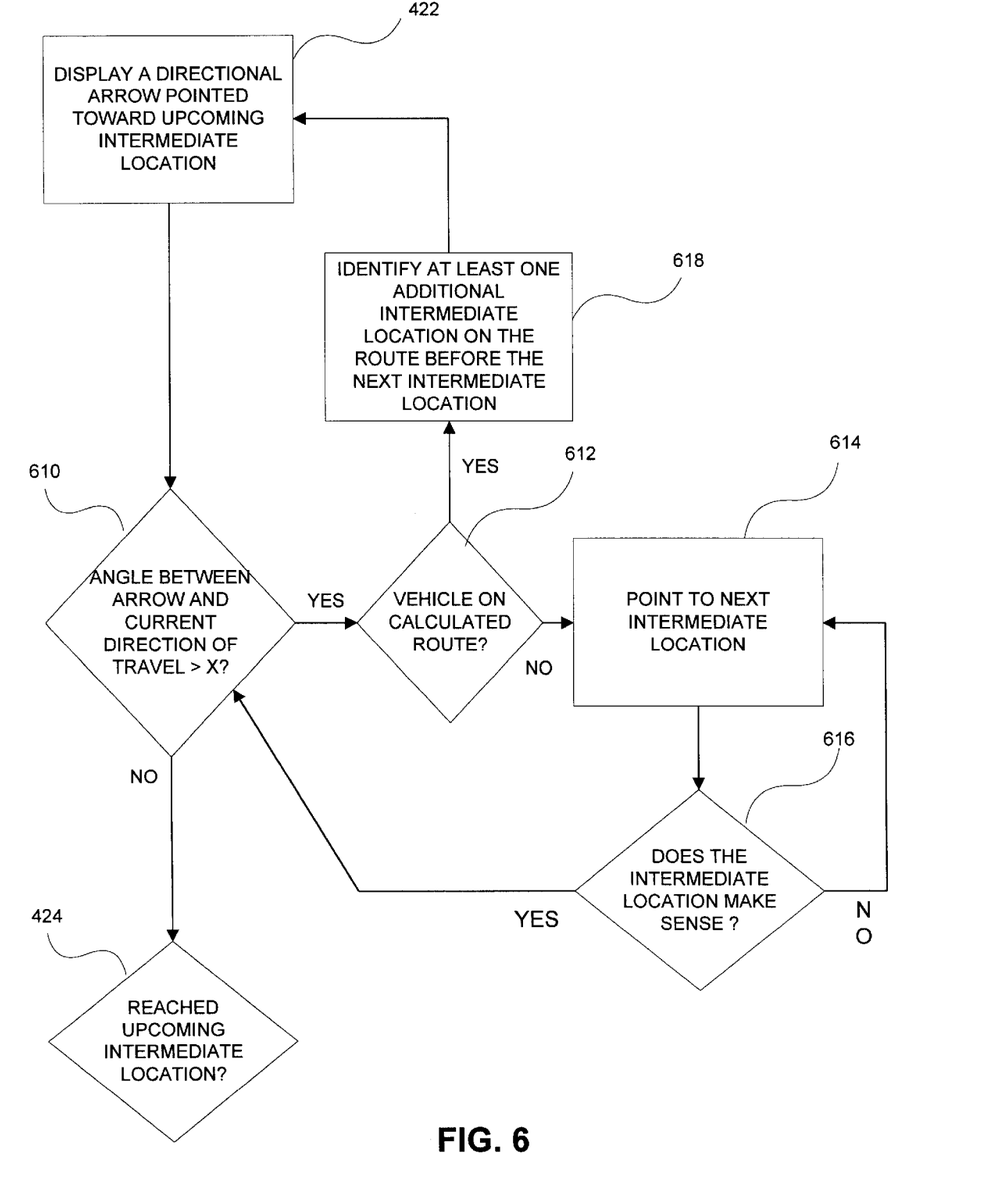
FIG. 6 is a flowchart illustrating a method of guiding a vehicle using a directional arrow in accordance with the embodiment of the present invention illustrated in FIG. 5.

FIG. 6 is a flowchart illustrating a method of guiding a vehicle using a directional arrow in accordance with the embodiment of the present invention discussed above with reference to FIG. 5. The method is shown in this flowchart as providing additional steps (610–618) between steps 422 and 424 as shown in FIG. 4B. It will be understood, however, that the invention is not so limited Initially, the directional arrow points to the upcoming intermediate location (422). While the vehicle is traveling the angle between the current direction of travel and the directional arrow is monitored. If the angle exceeds a predetermined threshold x, e.g., 45°, (610), a determination follows as to whether the vehicle location is on the calculated route (612). When the vehicle is off route, the directional arrow is changed to point to the next intermediate location (614). This would correspond to location 520 as shown in FIG. 5. A determination then follows as to whether this intermediate location makes sense (616). As described above the system may make this determination by generating a secondary route from the vehicle location to the intermediate location. Where the secondary route to the intermediate location requires, for example, backtracking, i.e., does not make sense, the system points to the next intermediate location (614). Thus, the system sequences through the intermediate locations until the angle 512 between the vehicle heading and the directional heading falls within the predetermined threshold (610) and the intermediate location "makes sense" (616).

It should be noted that the refinement of the present invention described with reference to FIGS. 5 & 6 also avoids potential confusion on, for example, serpentine routes wherein the initially identified intermediate locations in step 420 (See FIG. 4B) do not permit adequate convergence between the directional arrow and the vehicle heading. As shown in FIG. 6, where the angle exceeds the predetermined threshold value x (610) and the vehicle location lies on the calculated route (612), the system identifies at least one additional intermediate location on the route before the next intermediate location (618). Intermediate locations in various embodiments may be identified, for example, based on the rank of roads intersecting the calculated route. For example, a first set of intermediate locations may include major roads intersecting the calculating route. The intermediate location(s) identified in 618 may then include secondary (e.g., lower rank) roads intersecting the calculated route.

While the invention has been particularly shown and described with reference to specific embodiments, it will be understood by those skilled in the art that other details may be made without departing from the spirit or scope of the invention. For example, intermediate locations to which the directional arrow may be pointed may be determined "on the fly" rather than prospectively where the angle between the current direction of travel and the directional arrow exceeds some threshold. That is, different parts of the process described with reference to FIGS. 3B, 4B, and 6 may stand alone or be combined in various ways and yet remain within the scope of the invention. Therefore, in view of the foregoing, the scope of the invention should be determined by reference to the appended claims.

What is claimed is:

1. A vehicle navigation system comprising:
   a plurality of sensors for generating location data relating to a vehicle location;
   a memory for storing map data in a map database;
   a display; and a processor operable to:
determine the vehicle location using the location data, and
where the location data do not correspond to the map data, generate a directional indicator on the display which indicates a first location corresponding to the map data instead of a specified destination.

2. The vehicle navigation system of claim 1 wherein the processor is operable to determine the first location by searching the map database in a region around the vehicle location.

3. The vehicle navigation system of claim 2 wherein the first location corresponds to a road segment in the map database nearest the vehicle location.

4. The vehicle navigation system of claim 3 wherein the road segment in the map database is one of a plurality of road segments in the map database, each road segment having a rank associated therewith, and wherein the processor is further operable to determine the nearest road segment having ranks greater than or equal to a predetermined rank.

5. The vehicle navigation system of claim 3 wherein the road segment in the map database is a freeway on-ramp.

6. The vehicle navigation system of claim 1 wherein the processor is operable to identify the first location by searching the map database using an omnidirectional search.

7. The vehicle navigation system of claim 1 wherein the processor is operable to identify the first location by searching the map database in a direction biased toward the destination.

8. The vehicle navigation system of claim 1 wherein the first location comprises one of a major highway intersection, point of interest, landmark, an intersection of a highway and a lower ranked road, and a transition between a lower ranked highway and a higher ranked highway.

9. The vehicle navigation system of claim 1, wherein the first location is specified by the user.

10. The vehicle navigation system of claim 1, wherein the processor is operable to determine the vehicle location and generate the directional indicator immediately following powering up of the system.

11. The vehicle navigation system of claim 1, wherein the processor is operable to determine the vehicle location and generate the directional indicator when the vehicle location diverges from the map data.

12. The vehicle navigation system of claim 1, wherein the processor is further operable to calculate a route from the first location to the specified destination.

13. A vehicle navigation system associated with a vehicle comprising:
a plurality of sensors for generating location data relating to a vehicle location;
a memory for storing map data in a map database;
a display; and
a processor operable to:
generate a route between a first vehicle location and a destination,
identify at least one intermediate location corresponding to the map database between the first vehicle location and the destination on the route, and
where the vehicle has not yet reached the at least one intermediate location, generate a directional indicator on the display which indicates a direction corresponding to an upcoming one of the at least one intermediate location.

14. The vehicle navigation system of claim 13 wherein the at least one intermediate location comprises a plurality of intermediate locations and wherein the processor is operable to successively generate the directional indicator for each of the plurality of intermediate locations.

15. The vehicle navigation system of claim 13 wherein the at least one intermediate locations is one of a major highway intersection, point of interest, landmark, an intersection of a highway and a lower ranked road, and a transition between a lower ranked highway and a higher ranked highway.

16. The vehicle navigation system of claim 14 wherein each of the plurality of intermediate locations has a rank associated therewith and wherein the processor is operable to identify intermediate locations having ranks greater than or equal to a predetermined rank.

17. The vehicle navigation system of claim 14 wherein the processor is further operable to generate the directional indicator corresponding to the destination when all of the plurality of intermediate locations have been passed by the vehicle.

18. The vehicle navigation system of claim 14 wherein the processor is further operable to:
determine whether a current vehicle location is on the route, and
where the current vehicle location is not on the route, determine whether the upcoming intermediate location is an appropriate target for the directional indicator.

19. The vehicle navigation system of claim 18 wherein the processor is operable to determine whether the upcoming intermediate location is the appropriate target by determining if there is sufficient connectivity between the current vehicle location and the intermediate location.

20. The vehicle navigation system of claim 18 wherein the determination as to whether the intermediate location is the appropriate target is performed by determining if the intermediate location lies on the route beyond a distance specified by the user.

21. The vehicle navigation system of claim 18 wherein the determination as to whether the intermediate location is the appropriate target is performed by determining if the intermediate location lies between traffic congestion and the destination as determined by traffic data communicated to the processor.

22. The vehicle navigation system of claim 18, where the upcoming intermediate location is not the appropriate target, the processor is operable to determine whether a next one of the plurality of intermediate locations is the appropriate target and repeat until the appropriate target is identified.

23. The vehicle navigation system of claim 18, where the upcoming intermediate location is not the appropriate target, the processor is operable to determine which of a remaining subset of the intermediate locations is a best target for the directional indication.

24. The vehicle navigation system of claim 14 wherein the processor is further operable to monitor an angle between a current vehicle heading and the directional indicator.

25. The vehicle navigation system of claim 24 wherein the processor is further operable to identify at least one additional intermediate location on the route before the upcoming intermediate location, when the angle exceeds a predetermined threshold, and generate the directional indicator corresponding to the additional intermediate location.

26. the vehicle navigation system of claim 24 wherein the processor is further operable to determine whether a current vehicle location is on the route.

27. The vehicle navigation system of claim 26 wherein the processor is further operable to identify at least one additional intermediate location on the route before the upcoming intermediate location when the angle exceeds a predetermined threshold and where a current vehicle location is on the route.

28. The vehicle navigation system of claim 27 wherein the processor is further operable to generate a directional indicator on the display which indicates the direction to the upcoming one of the at least one intermediate location, when the angle exceeds the predetermined threshold and where the current vehicle location is off the route.

29. The vehicle navigation system of claim 28 wherein the processor is further operable to determine whether the upcoming intermediate location is the appropriate target for the directional indicator.

30. The vehicle navigation system of claim 29 wherein the processor is further operable to determine whether the upcoming intermediate location is the appropriate target by determining if there is sufficient connectivity between the current vehicle location and the intermediate location.

31. The vehicle navigation system of claim 29 wherein the processor is further operable to determine whether the upcoming intermediate location is the appropriate target by determining if the intermediate location lies on the route beyond a distance specified by the user.

32. The vehicle navigation system of claim 29, wherein the processor is further operable to determine whether the upcoming intermediate location is the appropriate target by determining if the intermediate location lies between traffic congestion and the destination as determined by traffic data communicated to the processor.

33. The vehicle navigation system of claim 29, where the upcoming intermediate location is not the appropriate target, the processor is operable to determine whether a next one of the plurality of intermediate locations is the appropriate target and repeat until the appropriate target is identified.

34. The vehicle navigation system of claim 18, where the upcoming intermediate location is not the appropriate target, the processor is operable to determine which of a remaining subset of the intermediate locations is a best target for the directional indication.

35. A vehicle navigation system associated with a vehicle comprising:
   a plurality of sensors for generating location data relating to a vehicle location;
   a memory for storing map data in a map database;
   a display; and
   a processor operable to:
      generate a route,
      monitor an angle between a current vehicle heading and a directional indicator to a first location associated with the route,
      when the angle exceeds a predetermined threshold, identify an intermediate location on the route, and
      display a directional indicator corresponding to the intermediate location.

36. The vehicle navigation system of claim 35 wherein the processor is further operable to determine whether a current vehicle location is on the route and where the current vehicle location is off the route to determine whether an upcoming intermediate location is an appropriate target for the directional indicator.

37. The vehicle navigation system of claim 36 wherein the processor is further operable to determine whether the upcoming intermediate location is the appropriate target by determining if there is sufficient connectivity between the current vehicle location and the intermediate location.

38. The vehicle navigation system of claim 36 wherein the processor is further operable to determine whether the upcoming intermediate location is the appropriate target by determining if the intermediate location lies on the route beyond a distance specified by the user.

39. The vehicle navigation system of claim 36 wherein the processor is further operable to determine whether the upcoming intermediate location is the appropriate target by determining if the intermediate location lies between traffic congestion and the destination as determined by traffic data communicated to the processor.

40. A computer implemented method for navigating using a vehicle navigation system, the method comprising:
   generating in a vehicle navigation system data relating to a vehicle location;
   determining the vehicle location using location data obtained from a plurality of sensors;
   accessing map data stored in a map database; and
   generating a directional indicator on a display which indicates a first location instead of the specified destination corresponding to the map data where the vehicle location does not correspond to the map data.

41. A computer implemented method for navigating using a vehicle navigation system, the method comprising:
   generating in a vehicle navigation system data relating to a vehicle location;
   determining the vehicle location using the location data;
   accessing map data stored in a map database;
   generating in a processor a route between a first vehicle location and a destination;
   identifying in the processor at least one intermediate location on the route; and
   where the vehicle has not yet reached the at least one intermediate location, generating a directional indicator on the display which indicates the direction corresponding to an upcoming one of the at least one intermediate location.

42. A computer implemented method for navigating using a vehicle navigation system, the method comprising:
   generating in a vehicle navigation system data relating to a vehicle location;
   determining the vehicle location using the location data;
   accessing map data stored in a map database;
   generating in a processor a route between a first vehicle location and a destination;
   monitoring an angle between a current vehicle heading and a directional indicator which indicates the direction to a first location associated with the route, and
   when the angle exceeds a predetermined threshold, identifying an intermediate location, and
   displaying a directional indicator corresponding to the intermediate location.

43. A computer readable medium comprising computer program instructions for causing a computer to perform the method of claim 40.

44. A computer readable medium comprising computer program instructions for causing a computer to perform the method of claim 41.

45. A computer readable medium comprising computer program instructions for causing a computer to perform the method of claim 42.

* * * * *